US012641321B2

(12) United States Patent
Chasalow et al.

(10) Patent No.: US 12,641,321 B2
(45) Date of Patent: May 26, 2026

(54) METHOD AND SYSTEM FOR LIVE MULTICASTING PERFORMANCES TO DEVICES

(71) Applicant: Unity Technologies ApS, Copenhagen (DK)

(72) Inventors: Brian Phillip Chasalow, Lancaster, CA (US); Isabelle Riva, Salt Spring Island (CA)

(73) Assignee: Unity Technologies ApS, Copenhagen (DK)

( * ) Notice: Subject to any disclaimer, the term of this patent is extended or adjusted under 35 U.S.C. 154(b) by 480 days.

(21) Appl. No.: 17/993,834

(22) Filed: Nov. 23, 2022

(65) Prior Publication Data

US 2023/0164399 A1 May 25, 2023

Related U.S. Application Data

(60) Provisional application No. 63/283,111, filed on Nov. 24, 2021.

(51) Int. Cl.
H04N 21/6405 (2011.01)
H04N 21/242 (2011.01)

(52) U.S. Cl.
CPC ....... H04N 21/6405 (2013.01); H04N 21/242 (2013.01)

(58) Field of Classification Search
CPC .......................... H04N 21/6405; H04N 21/242
See application file for complete search history.

(56) References Cited

U.S. PATENT DOCUMENTS

| | | | |
|---|---|---|---|
| 10,897,637 B1 * | 1/2021 | Pham | ............... H04N 21/23406 |
| 2015/0163379 A1 * | 6/2015 | Herzog | .............. H04N 21/8126 |
| | | | 348/467 |
| 2017/0134830 A1 | 5/2017 | Walker et al. | |
| 2020/0162796 A1 | 5/2020 | Azuolas et al. | |
| 2021/0392179 A1 * | 12/2021 | Riviere | ............... H04L 65/4015 |

FOREIGN PATENT DOCUMENTS

WO      WO-2019122881 A1 *   6/2019   ....... H04N 21/64738

OTHER PUBLICATIONS

"European Application Serial No. 22209448.4, Extended European Search Report mailed Feb. 16, 2023", 10 pgs.
Canadian Application Serial No. 3,182,902, Examiners Rule 86(2) Report mailed Apr. 29, 2024, 5 pgs.

* cited by examiner

*Primary Examiner* — Hermon Asres
(74) *Attorney, Agent, or Firm* — Schwegman Lundberg & Woessner, P.A.

(57) ABSTRACT

A method of performing multicast broadcasting of a plurality of streams corresponding to an event is disclosed. The plurality of data streams corresponding to the event are received. Each of the plurality of streams has a different type or format. A multicast timecode is determined based on a synchronization time for each of a plurality of buffers associated with the plurality of streams. A new data stream is generated. The new data stream includes the plurality of data streams and the multicast timecode.

20 Claims, 7 Drawing Sheets

200

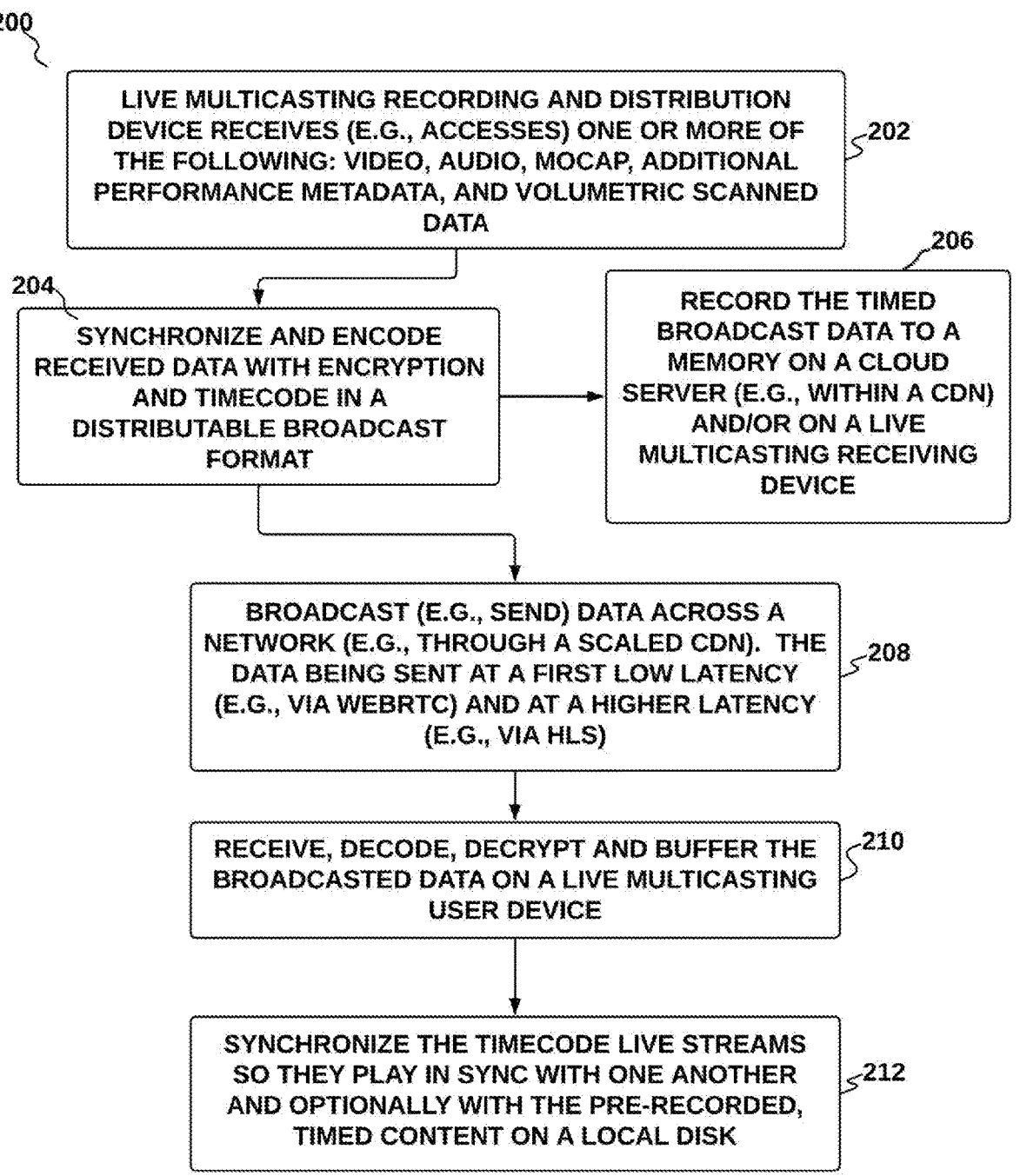

LIVE MULTICASTING RECORDING AND DISTRIBUTION DEVICE RECEIVES (E.G., ACCESSES) ONE OR MORE OF THE FOLLOWING: VIDEO, AUDIO, MOCAP, ADDITIONAL PERFORMANCE METADATA, AND VOLUMETRIC SCANNED DATA  ⌐202

204

SYNCHRONIZE AND ENCODE RECEIVED DATA WITH ENCRYPTION AND TIMECODE IN A DISTRIBUTABLE BROADCAST FORMAT

206

RECORD THE TIMED BROADCAST DATA TO A MEMORY ON A CLOUD SERVER (E.G., WITHIN A CDN) AND/OR ON A LIVE MULTICASTING RECEIVING DEVICE

BROADCAST (E.G., SEND) DATA ACROSS A NETWORK (E.G., THROUGH A SCALED CDN). THE DATA BEING SENT AT A FIRST LOW LATENCY (E.G., VIA WEBRTC) AND AT A HIGHER LATENCY (E.G., VIA HLS)  ⌐208

RECEIVE, DECODE, DECRYPT AND BUFFER THE BROADCASTED DATA ON A LIVE MULTICASTING USER DEVICE  ⌐210

SYNCHRONIZE THE TIMECODE LIVE STREAMS SO THEY PLAY IN SYNC WITH ONE ANOTHER AND OPTIONALLY WITH THE PRE-RECORDED, TIMED CONTENT ON A LOCAL DISK  ⌐212

Fig. 2

METHOD AND SYSTEM FOR LIVE MULTICASTING PERFORMANCES TO DEVICES

CROSS-REFERENCE TO RELATED APPLICATIONS

This application claims the benefit of U.S. Provisional Application No. 63/283,111, filed Nov. 24, 2021, which is incorporated by reference herein in its entirety.

TECHNICAL FIELD

The subject matter disclosed herein generally relates to the technical field of digital content generation and distribution.

BACKGROUND

To fully appreciate virtual events such as concerts, conferences and sports, a system capable of end-to-end broadcasting and synchronization of multiple types of live inputs is required. Performance data for an event may originate from several different sources simultaneously (e.g., dancers in motion capture ("mocap") suits, singers on stage, a video broadcast feed, and a video jockey ("VJ")/show control operator), and getting all of these multiple streams synchronized and buffered to play on remote customer devices at low latency is not possible on current systems. Current broadcast systems may use multiple audio or video streams and broadcast it to a single endpoint; however, those systems are not capable of synchronizing inputs from multiple sources, beyond audio and video, and streaming that data at low latency, simultaneously on millions of customer devices.

BRIEF DESCRIPTION OF THE DRAWINGS

Features and advantages of example embodiments of the present disclosure will become apparent from the following detailed description, taken in combination with the appended drawings, in which:

FIG. 2 is a flowchart illustrating a method for live multicasting of performance data using a live multicasting performance system, in accordance with one embodiment;

DETAILED DESCRIPTION

Figure 1:
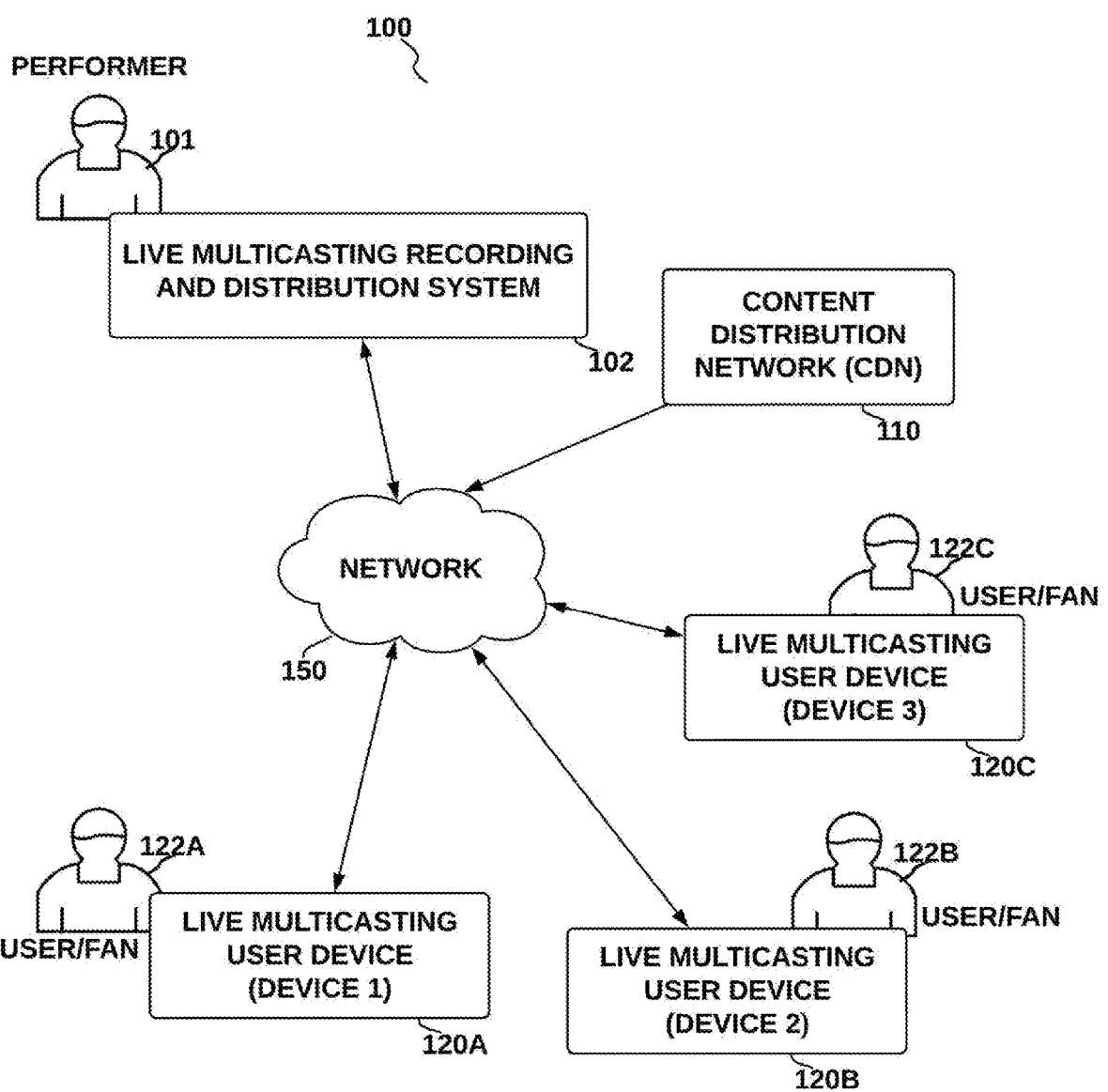
FIG. 1 is a schematic illustrating a live multicasting performance system, in accordance with one embodiment.

The description that follows describes example systems, methods, techniques, instruction sequences, and computing machine program products that comprise illustrative embodiments of the disclosure, individually or in combination. In the following description, for the purposes of explanation, numerous specific details are set forth in order to provide an understanding of various embodiments of the disclosed subject matter. It will be evident, however, to those skilled in the art, that various embodiments of the disclosed subject matter may be practiced without these specific details.

A method of performing multicast broadcasting of a plurality of streams corresponding to an event is disclosed. The plurality of data streams corresponding to the event are received. Each of the plurality of streams has a different type or format. A multicast timecode is determined based on a synchronization time for each of a plurality of buffers associated with the plurality of streams. A new data stream is generated. The new data stream includes the plurality of data streams and the multicast timecode.

The present disclosure includes apparatuses which perform one or more operations or one or more combinations of operations described herein, including data processing systems which perform these operations and computer readable media which, when executed on data processing systems, cause the systems to perform these operations, the operations or combinations of operations including non-routine and unconventional operations or combinations of operations.

The systems and methods described herein (referred to herein as a live multicasting performance system and method) include one or more components or operations that are non-routine or unconventional individually or when combined with one or more additional components or operations, because, for example, they provide a number of valuable benefits to content creators and distributors. In the 3D virtual events world of concerts, conferences, and sports, there are many types of inputs that a performer may need to transmit to connected attendees (e.g., fans) over a network, including video, audio, motion capture data, show control messages, and other kinds of data messages. An event might be performed real-time, or recorded to be played back later. The systems and methods described herein may provide an archival and playback mechanism. Furthermore, the live multicasting performance systems and methods described herein describe a pipeline that includes a low-latency, interactive performer stream comprising of a series of optional tracks, including video, audio, motion capture (mocap), virtual disk jockey ("DJ") (or VJ) event data (e.g., show control data), and additional metadata. This pipeline (and format described herein) provides a flexible system for an end-to-end broadcasting and synchronization of data in the optional tracks that may scale to millions of connected attendees.

In accordance with an embodiment, the live multicasting performance systems and methods described herein provide a mechanism for one or more remote attendees of an event to interactively connect with a performer within the event. The systems and methods also provide performers with an ability to view themselves and audiences during performances, and have input controls that allow for an interactive experience with the attendees. The systems and methods described herein enable fans to engage with performers in interactive ways, and describes a set of tooling that serves as an extensible infrastructure that may help creators to build and operate virtual events.

In accordance with an embodiment, the live multicasting performance systems and methods described herein may include a pipeline (e.g., as discussed in FIG. 2, FIG. 3A, FIG. 3B, and FIG. 4) that utilizes network based real-time communication and streaming (e.g., including WebRTC, HTTP Live Streaming (HLS), and more) as an intermediary transmission method for both a low-latency communication mode, and a high-latency communication mode. In accordance with an embodiment, the low-latency mode (e.g., real-time mode) may be a live stream mode as shown in 412 and 424 of FIG. 4, wherein remote attendees of an event are able to connect (e.g., over a network) at near real-time speeds (e.g., at sub 1 second latency) to a performer stream (e.g., a stream created by a performer). The low-latency real-time mode may comprise premium interactivity (e.g., as shown in 414 of FIG. 4) that includes 1:1:many interactivity (one-to-one-to-many interactivity), wherein a performer can connect directly with an attendee, interact with the attendee, and rebroadcast the interaction back to a remainder of the audience. In accordance with an embodiment, the low-latency mode may include a use of a real-time low latency network communication method such as WebRTC.

In accordance with an embodiment, the high-latency mode may include a larger latency (e.g., 2 to 15 seconds) from performer to attendee, but may also include the following additional benefits:

Recording and later playback of performances (e.g., using pre-recorded media as shown in 410 and 422 in FIG. 4), via an on-demand service that includes playback and synchronization of all inputs including video, audio, motion capture data, show control messages, and other kinds of data messages. This may enable purchasing of pre-recorded performances.

Enabling redundancy for show control systems. For example, a low-latency mode or a high-latency mode performance may be tagged as a "redundant" performance, and an admin show control operator may switch all attendees from a main performance to a redundant performance based on a problem with the main performance during a live event (e.g., as described with respect to an emergency system 360 and 362 shown in FIG. 3B).

Recording performances (or parts thereof) to a memory (as described in FIG. 2, FIG. 3A, and FIG. 4) may enable fast iteration, preview and rehearsals for performers. The recording also enables asynchronous creation of a performance or show (e.g., recording of parts of the show asynchronously). For example, a first part of a show may be recorded with several live performers (e.g., musicians and dancers) in advance of a live broadcast, while a second live part (e.g., a live singer) may be synchronized with the first part and broadcast live such that only the signer is truly a live performer during the broadcast.

In accordance with an embodiment, the low-latency mode and the high-latency mode may include basic interactivity wherein an attendee can vote, react, or have other methods to interact directly with the performer. In accordance with an embodiment, the high-latency mode may include a use of a network streaming technology such as (HTTP Live Streaming (HLS)).

Turning now to the drawings, systems and methods, including non-routine or unconventional components or operations, or combinations of such components or operations, for live multicasting of performances in accordance with embodiments of the disclosure are illustrated. In example embodiments, FIG. 1 is a diagram of a live multicasting performance system. In the example embodiment, the live multicasting performance system 100 includes a live multicasting performance recording and distribution system

102, with devices therein operated by at least one user 101 (also referred to as a 'performer') and coupled in networked communication with one or more live multicasting performance user devices (120A, 120B, and 120C) via a network 150 (e.g., a cellular network, a Wi-Fi network, the Internet, and so forth). The live multicasting user devices (120A, 120B, and 120C) may be operated by a user/fan (122A, 122B, and 122C). In some embodiments, the live multicasting performance recording and distribution system 102 includes one or more mobile computing devices, such as smartphones or tablet computers. In other embodiments, the live multicasting performance recording and distribution system 102 includes computing devices such as desktop computers. In still other embodiments (and as shown below in FIG. 3A and FIG. 3B), the live multicasting performance recording and distribution system 102 may comprise a plurality of devices for recording and distribution, including cameras 306 (306A, 306B, and 306C), video mixer hardware 320, live capture tools (e.g., mocap devices) 334, an encoder 346, a midi performance controller 312, and more.

In some embodiments, the live multicasting performance system 100 and the various associated hardware and software components described herein may provide AR content instead of, or in addition to, VR content (e.g., in a mixed reality (MR) environment). It should be understood that the systems and methods described herein (e.g., with respect to FIG. 2, FIG. 3A, FIG. 3B, FIG. 4, FIG. 5, and FIG. 6) may be performed with XR content and, as such, the scope of this disclosure covers AR, MR, and VR applications.

Figure 3A:
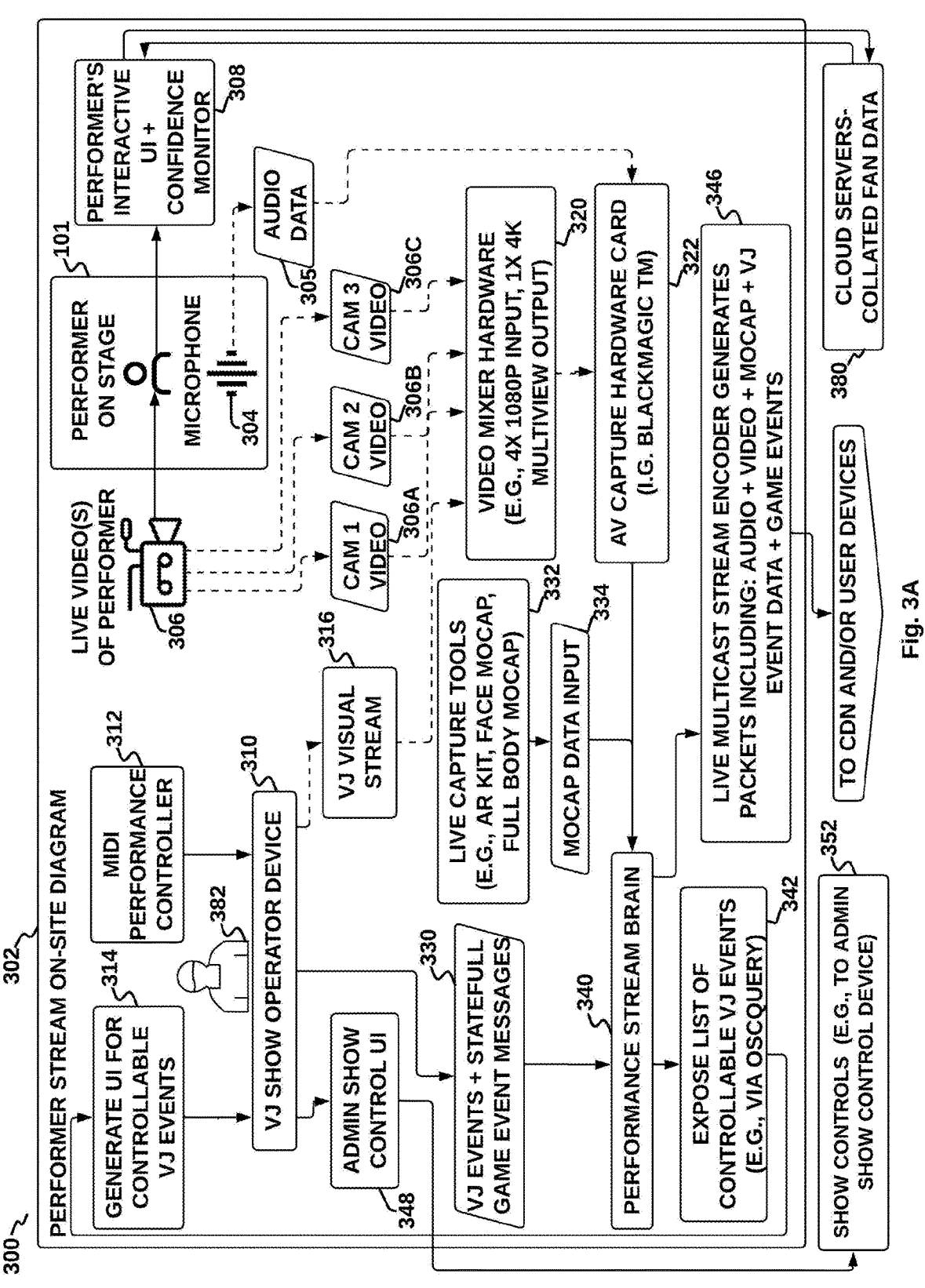
FIG. 3A is a data flow diagram of a live multicasting performance system, in accordance with an embodiment.
Figure 5:
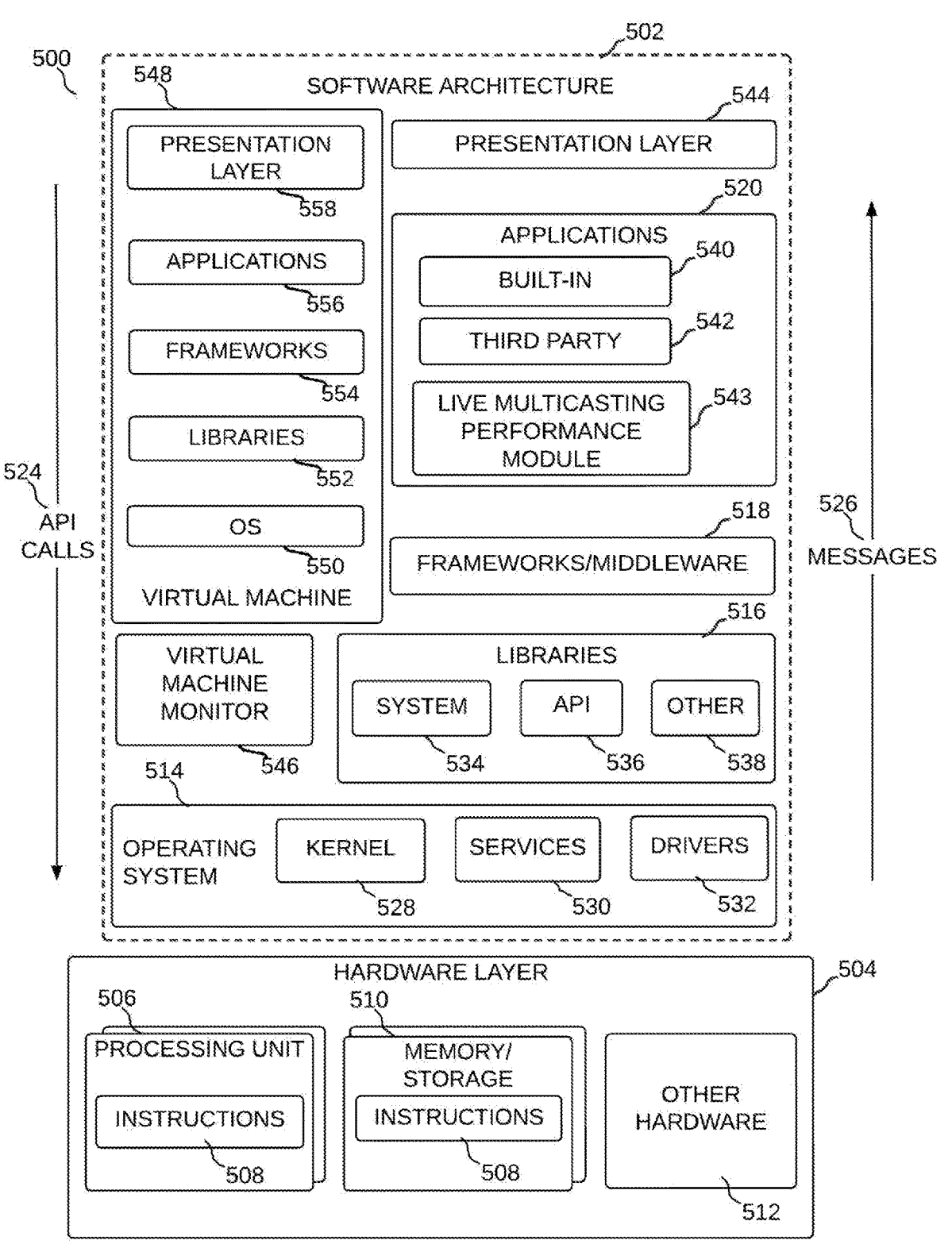
FIG. 5 is a block diagram illustrating an example software architecture, which may be used in conjunction with various hardware architectures described herein.

In accordance with an embodiment, and as shown in FIG. 2, is a flowchart for a method 200 for live multicasting performances. The method 200 may be used in conjunction with the live multicasting performance system 100 as described with respect to FIG. 1. In various embodiments, some of the method elements shown may be performed concurrently, in a different order than shown, or may be omitted. In accordance with an embodiment, the operations 202 through 212 in the method 200 may be carried out by a live multicasting performance module 543 (as shown in FIG. 5) within the application layer 520 of a software architecture 502 within a live multicasting recording and distribution system 102 and a live multicasting user device 120. In accordance with an embodiment, at operation 202 of the method 200, the live multicasting recording and distribution system 102 may access (e.g., receive as input) any number and type of timed data formats associated with a performance (e.g., a live show), including (as shown in FIG. 3A): video from cameras 306 (306A, 306B, and 306C), audio 305, mocap (body/face/finger) 334 from live capture tools 332 (e.g., mobile devices, full room mocap systems, and the like), additional performance metadata (e.g., performer show control signals including Virtual DJ (VJ) event data and messages) 330, volumetric scanned data (not shown in FIG. 3A), and more. The performance data may originate from several sources simultaneously (e.g., using live capture tools 332, video cameras 306, microphones 304, a VJ show operator device 310, and more as shown in FIG. 3A); for example, dancers in mocap suits, singers on a stage, a video broadcast feed, a virtual DJ or show control operator device 310, and more. Received data in each data format may be referred to herein as a data stream, wherein each data stream may represent a performance for one or more artists. For example, received video data may be referred to as a video stream, and associated audio data (e.g., from one or more musical artists) may be referred to as an audio stream, furthermore, an associated mocap data (e.g., from a mocap artist) may be referred to as a mocap stream.

In accordance with an embodiment, at operation 204 of the method 200, the live multicasting recording and distribution system 102 encodes the accessed data into at least one distributable broadcast format (e.g., HLS+timed_id3 data), wherein the encoding may include encryption of data and may also include an adding of multicast timecodes for each accessed data format. In accordance with an embodiment, the encoding and adding of multicast timecodes may replace or be in addition to native timecodes already present with the accessed data. For example different data streams including audio data, video data, mocap data, volumetric data, show control data, and other metadata may individually employ different native timecode strategies for playing back data on client devices. However, the native timecodes may fail to work when trying to synchronize playback of a plurality of different types of data sources with low latency (one issue being buffer size); for example, audio might be able to keep a 30 second buffer in memory while volumetric data, due to memory constraints, might have a much smaller valid synchronization window (e.g., a 5 second buffer). However, if audio were to audibly momentarily pause to re-sync with volumetric data, it could have a dramatically negative impact on user experience. In accordance with an embodiment, and as part of operation 204, the determination of the multicast timecodes may include solving for an optimal (e.g., minimum) valid synchronization time which may be used for the multicast timecodes in order to create an optimum timecode (e.g., a time that works with all buffers for each accessed data type). In accordance with an embodiment, and as part of operation 204, the encoding of the accessed data into at least one distributable broadcast format may include aligning one or more of the data streams in time based on the determined multicast timecodes (e.g., based on a determined optimum timecode). For example, a plurality of data streams capturing an event (e.g., a concert) including a video data stream, an audio data stream, a mocap data stream, a control data stream, and more may all be encoded within a distributable broadcast format using a common timecode (e.g., the determined optimum timecode). In accordance with an embodiment, and as part of operation 204, the encoding of the accessed data into the at least one distributable broadcast format may include packing the data into a combined data format and multicast timecode (e.g., HLS+timed_id3) container format that packs video data, mocap data, audio data, control data, and other data. In accordance with an embodiment, the optimal valid synchronization time may involve solving for a synchronization strategy with a configurable (e.g., "ground truth") playback time on client devices that has a minimum amount of negative impact on the playback (e.g., skipping, pausing, etc.) and which may be based on the determined multicast timecode (e.g., an optimum timecode). In accordance with an embodiment, the optimum valid synchronization time may include determining a minimum buffer for each data type which can avoid buffer underruns on playback.

In accordance with an embodiment, at operation 206 of the method 200, the live multicasting recording and distribution system 102 records (e.g., saves) the multicast timed broadcast data (e.g., the encoded data from operation 204) to a memory (e.g., a hard drive) on a cloud server or on a live multicasting user device 120. For example, the live multicasting recording and distribution system 102 may save HLS files containing the encoded data to a cloud content delivery network (CDN) for further distribution (e.g., as part of operation 208). In accordance with an embodiment, as part of operation 206, the encoded data may be sent over the network 150 from the live multicasting recording and distribution system 102 to the CDN or the live multicasting user device 120.

In accordance with an embodiment, at operation 208 of the method 200, the live multicasting recording and distribution system 102 sends (e.g., broadcasts) the encoded data (e.g., the encoded data generated in operation 204) across the network 150 (e.g., which may be received and used by one or more live multicasting user devices 120 as described in operation 210 and operation 212). In accordance with an embodiment, the encoded data may be broadcasted in one or more tiers wherein the tiers have a difference in latency. For example, the encoded data may be broadcast in a first tier (e.g., for premium clients) which has a low latency. The low latency broadcast may be implemented using a real-time broadcasting technology (e.g., streaming technology) which has a low latency (e.g., WebRTC). As another example, the encoded data may additionally be broadcast in a second tier (e.g., for standard or non-premium clients) having a higher latency. For example, the higher latency broadcast may be implemented with a broadcasting or streaming technology with a higher latency (e.g., broadcasting via an HLS endpoint or with WebRTC with a preconfigured latency). In accordance with an embodiment, as part of operation 208, the low latency tier and the higher latency tier may be broadcast concurrently by a single live multicasting recording and distribution system 102. In accordance with an embodiment, as part of operation 208, the live multicasting recording and distribution system 102 sends the data through a massively scaled/distributed CDN.

In accordance with an embodiment, at operation 210 of the method 200, the live multicasting user device 120 receives (e.g., which may include accessing data over the network 150) the broadcasted data on a plurality of client devices (e.g., 120A, 120B, and 120C). In accordance with an embodiment, as part of operation 210, the receiving may include decoding of the broadcasted data, wherein the decoding removes or inverses part or all of an encoding applied to the broadcasted data (e.g., encoding applied during operation 204). In accordance with an embodiment, as part of operation 210, the receiving may include decrypting of the broadcasted data, wherein the decrypting removes or inverses part or all of an encryption applied to the broadcasted data (e.g., encryption applied during operation 204). In accordance with an embodiment, as part of operation 210, the receiving may include buffering of the broadcasted data, wherein the buffering may include buffering each data stream within the broadcasted data in a separate buffer. In accordance with an embodiment, the buffering may include determining a minimum buffer size for a data type based on a minimum valid synchronization time may (e.g., as determined in operation 204). In accordance with an embodiment, the live multicasting user device 120 may concurrently receive both a first tier low latency broadcast and a second tier higher latency broadcast wherein both tiers represent a same event broadcast. In accordance with an embodiment, the encoded data broadcast in the second tier (e.g., the higher latency broadcast) may be fully or partially recorded on the user device 120 to provide a redundancy for a first tier low latency live stream source. For example, based on an interruption of a first-tier low latency performance broadcast, a user device 120 may switch to a playback of the recorded performance from the higher latency second tier broadcast (e.g., HLS) which may be less impacted by the interruption. As another example, the based on an a determination of cost of a first-tier low latency performance broadcast being above a threshold, a user device 120 may switch to a playback of the recorded performance from the higher latency second tier broadcast (e.g., HLS) which may have an associated lower cost.

In accordance with an embodiment, at operation 212 of the method 200, the live multicasting user device 120 synchronizes the broadcasted time coded data (e.g., synchronizes the data streams received in operation 210) so that the data streams therein (e.g., video data stream, mocap data stream, audio data stream, volumetric data stream, show control data stream, metadata stream, and other data) play in sync with one another. In accordance with an embodiment, the synchronization of the data streams may be based on a determined multicast timecode which is included in the broadcast data (e.g., the multicast timecode determined in operation 204), and wherein one or more of the data streams use a single synchronization time based on the determined multicast timecode. In accordance with an embodiment, the live multicasting user device 120 may also synchronize the broadcasted data with pre-recorded, timed content in a local memory (e.g., data recorded or saved in operation 206). In accordance with an embodiment, as part of operation 212, the broadcasted data may be played back live (e.g., as they are received and synchronized), or through a synchronized playback of the recorded data (e.g., which may be hosted on a cloud server).

In accordance with an embodiment, and as described in the method 200, the plurality of received/accessed data streams are synchronized as close to the signal source(s) as possible on the live multicasting recording and distribution system 102 (e.g., before transmission over the network) to take advantage of a configurable large accessible memory for buffering multiple streams within the system 102. The memory within the live multicasting recording and distribution system 102 may be configured (e.g., by the performer) to be large and fast, whereas a memory within a live multicasting user device 120 may not be controlled by the performer, and may be low quality (e.g., small memory size and low speed access). The method 200 synchronizes (e.g., during operation 204) the plurality of data streams on the live multicasting recording and distribution system 102, which can solve for a minimum valid synchronization time, align the data streams in time, and pack all the data into a combined container format (e.g., HLS+timed_id3) that packs video, mocap, audio, metadata, and other data, which then gets streamed out (e.g., during operation 208) to a distributed server architecture (e.g., such as Amazon's Cloudfront and the like) for broader consumption.

In accordance with an embodiment, the received timed data streams (e.g., received in operation 202) may include a plurality of live performance data (e.g., including mocap) that can be streamed to a plurality of live multicasting user devices 120. One example of a received timed data stream may include embedded controls that trigger special effects (e.g., virtual effects) on a display of the user device 120. The timing of the triggers may be configurable (e.g., controlled) by an operator. For example, the control data may originate from a show operator (which may include a performer 101) controlling virtual effects within a virtual world (e.g., providing a performance) in real-time using mocap or any other kind of dynamic control mechanism like foot pedals, sliders, knobs, etc. A performer (e.g., musical performer, actor, or other) might also behave as a control operator and be on a stage hitting foot pedals in order to initiate special effects to choreograph a show. In accordance with an embodiment, an operator may use the live multicasting system 100 to record a performance of a controlling of a virtual show (e.g., recording a pushing of foot pedals and sliders, and turning of knobs that control virtual special effects) in advance of a live performance of the show (e.g., to be able to fine tune a visual performance). Performances could be live-streamed or recorded.

In accordance with an embodiment, the control data may control events (e.g., a triggering of special effects) within a digital world; accordingly, the control may cover any virtual effect. For example, the control data may include controls for a particle visual effect such as fog, and it may also include controls for transforming the virtual world in any way (e.g., flipping the world upside down, transforming the world from a first world environment to a second, transforming a visual style of the world, etc.). In addition, the control data may transform user avatars within the digital world. For example, a performer on a stage may use a gesture towards a crowd as a transforming signal to transform crowd avatars into creature avatars (e.g., or transforming a portion of the crowd avatars), wherein the gesture is recorded by motion sensors and used to trigger the virtual transformation of the crowd avatars. In accordance with an embodiment, the control data may be transmitted in data channels (e.g., WebRTC data channels) and recorded as timed metadata inside a high or low latency broadcast (e.g., within an HLS stream for high latency broadcast).

In accordance with an embodiment, the method 200 may enable novel forms of interactivity via the control data sent through the pipeline. This includes video chat with a performer, voting, reactions, and other ways for performers to interact with fans.

The methods and systems described herein may empower show creators with freedom to create a new medium and a new type of experience that allows for extremely interactive events and not just passive-watching experiences. The methods and systems described here allow for the possibility of incredible liveness and improvisation during a show based on a plurality of synchronized data formats being transmitted live from stage to a plurality of user devices 120 for each attendee.

In accordance with an embodiment, FIG. 3A shows a data flow diagram of the live multicasting recording and distribution system 102. The system may include a plurality of devices including one or more cameras 306 (generating video camera stream data 306A, 306B, and 306C), one or more microphones 304 (e.g., on a stage), video mixer hardware 320, live capture tools 332, a VJ show operator device 310, a midi performance controller 312, a performance stream brain 340, a live multicast stream encoder 346. In accordance with an embodiment, at least one camera 306 may generate video streams (306A, 306B, and 306C) of a performer 101 (e.g., on a stage). The video streams (306A, 306B, and 306C) may be part of the accessed/received data in operation 202. In accordance with an embodiment, at least one camera (not specifically shown in FIG. 3A) may generate a VJ visual stream 316 capturing video of the VJ. The VJ visual stream (316) may be part of the accessed/received data in operation 202. In accordance with an embodiment, the one or more microphones 304 may record one or more audio data streams 305. The audio data stream 305 may be part of the accessed/received data in operation 202. In accordance with an embodiment, the captured video (306A, 306B, and 306C) and audio 305 may be routed and/or processed via an audio/video capture hardware card 322. The output of the AV capture hardware card 322 may be processed by a performance stream brain 340, wherein the stream brain 340 may be a device or module capable of processing audio/video, mocap data, VJ control data, and more. In accordance with an embodiment, the live capture tools 332 may capture (e.g., record) motion of the performer 101 or an additional performer (not shown). In accordance with an embodiment, the VJ show operator device 310 may be operated by a VJ 382, whereby the VJ may control special effects on a stage or special effects added to a video stream or to a volumetric stream. In accordance with an embodiment, the VJ 382 may be the performer 101. In accordance with an embodiment, the VJ show operator device 310 may include an admin show control UI 348 which may generate show controls 352 due to an interaction of the VJ 382 with the admin show control UI 348. The show controls 352 may be used by an admin show control device 350 as described with respect to FIG. 3B. In accordance with an embodiment, the VJ show operator device 310 may generate data describing VJ events (e.g., in response to an interaction with the VJ 382) and event messages 330. The VJ event data 330 may include the show controls 352. In accordance with an embodiment, the performance stream brain 340 may expose a list of controllable VJ events 342 (e.g., a list of control signals or codes) to the VJ show operator device 310. In addition, the performance stream brain 340 may generate and display 314 a user interface for displaying the controllable VJ events. In accordance with an embodiment, the live multicast stream encoder 346 performs the encoding described in operation 204 and outputs encoded data (e.g., encrypted and synchronized data) to a CDN 110 and then to user devices 120 as shown in FIG. 1. In accordance with an embodiment, the live multicast stream encoder 346 may be part of the performance stream brain 340.

Figure 3B:
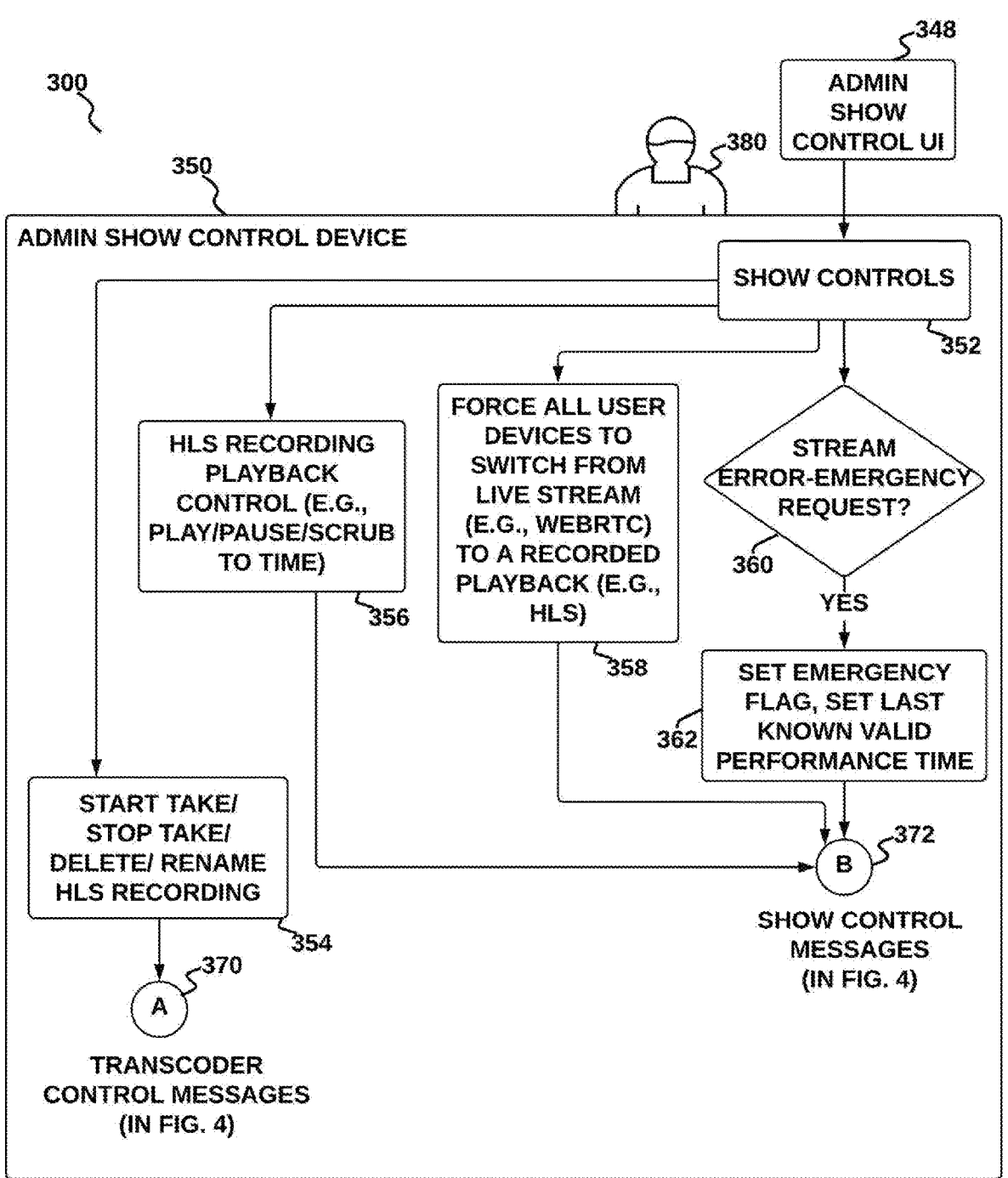
FIG. 3B is a data flow diagram of a live multicasting performance system that includes an admin show control device, in accordance with an embodiment.
Figure 4:
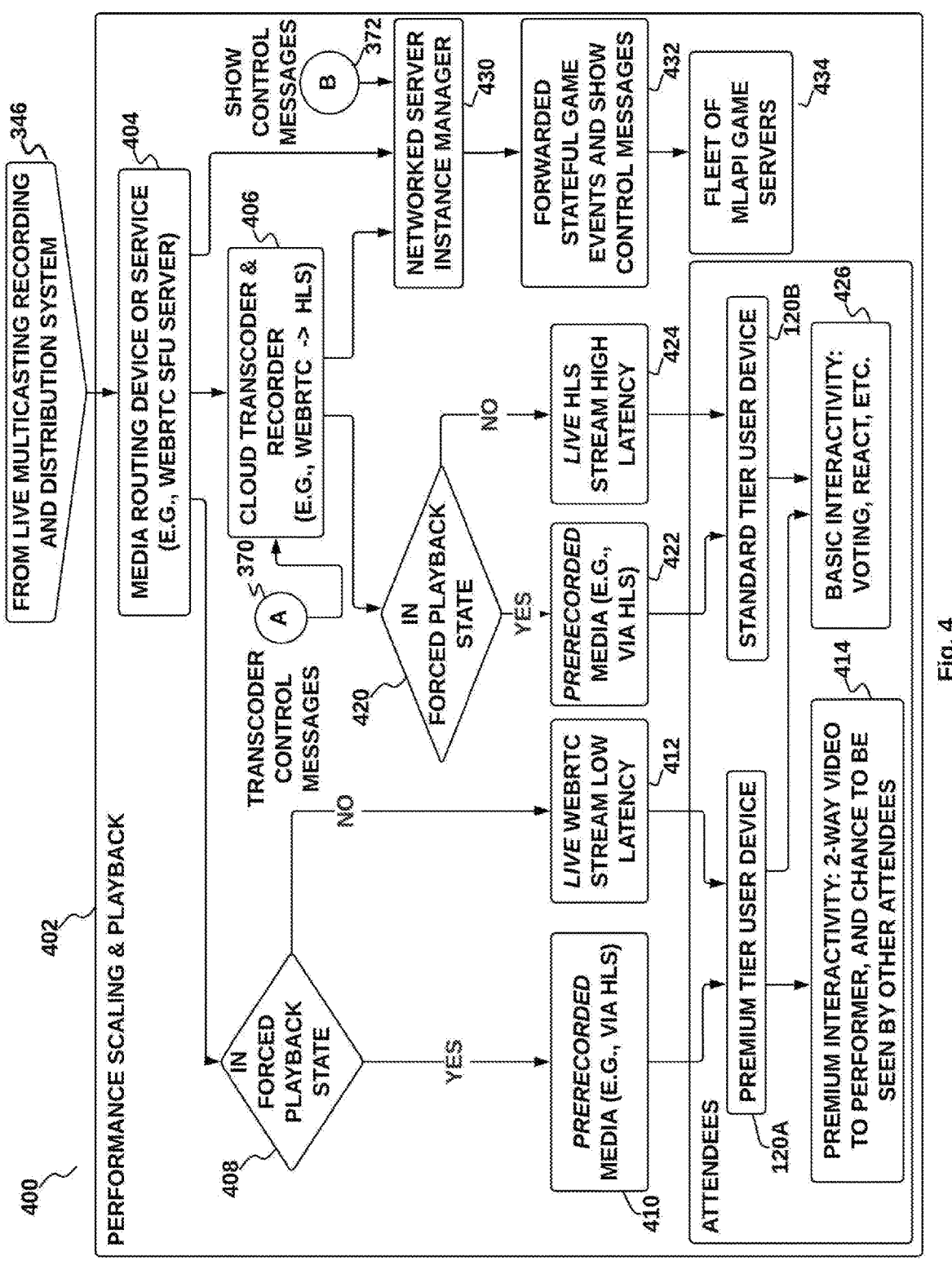
FIG. 4 is a data flow diagram of scaling and playback of a performance within a live multicasting performance system, in accordance with an embodiment.

In accordance with an embodiment, FIG. 3B shows an additional data flow diagram of the live multicasting recording and distribution system 102. In accordance with an embodiment, an administrator 380 (or VJ 382 or performer 101) may use an admin show control device 350 to control (or add control data) to the output of the encoder 346 or to the CDN 110 (e.g., via a cloud-based transcoder and recorder 406 or a server instance manager 430 as shown in FIG. 4). The admin show control device 350 may receive show controls 352 from the VJ 382 as described with respect to FIG. 3A and may use the show controls 352 to control an aspect of a recording (e.g., via operation 354) or playback (e.g., via operation 356, 358 and 362) on a user device 120. In accordance with an embodiment, the admin show control device 350 may implement the show controls 352 received from the VJ show operation device 310 and/or may modify the show controls prior to the implementation. The admin show control device 350 may control a starting, stopping, deletion or recording of data 354 via the cloud-based transcoder 406. The admin show control device 350 may also include a recording playback control 356 (e.g., for a HLS recording). The admin show control device 350 may also include a control 358 for forcing all user devices 120 to switch from a live stream to a recorded playback (e.g., from a live WebRTC stream to a HLS recording). In accordance with an embodiment, the admin show control device 350 may include error management 360, 362 that may include setting an emergency flag and setting a last known valid performance time (e.g., in order to revert to the last known valid performance time during a disrupted playback).

In accordance with an embodiment, and shown in FIG. 4, is a data flow diagram for scaling and playback of an output data stream generated by a live multicasting recording and distribution system 102 using the method 200 (e.g., and as described with respect to FIG. 3A and FIG. 3B). The scaling may use the CDN 110 (e.g., as described in operation 206 and 208), and the playback may be performed on a live multicasting user device 120 as described in operation 210 and 212. In accordance with an embodiment, a media routing device or service 404 may send a data stream 346 (e.g., the data stream created in operation 204 and described with respect to FIG. 3A) to one or more places (e.g., user devices 120, a server 430 or other services 406). The media routing device or service 404 (e.g., a selective forwarding unit or SFU) may receive multiple media streams 346 and determine which of the received streams should be sent to a user device 120. In accordance with an embodiment (and as described with respect to operations 208, 210, and 212) the media routing device or service 404 may divert the data stream to a first low latency tier path (e.g., for a premium tier user device 120A) with premium interactivity 414 that may include 2-way video with the performer 101 with a chance to be seen by other attendees as described within the method 200. In accordance with an embodiment (and as described with respect to operations 208, 210, and 212), the media routing device or service 404 may divert the data stream to a second higher latency tier path (e.g., for a standard tier user device 120B) with basic interactivity 426 that may include voting and simple one-way reactions as described within the method 200. Any tier (e.g., a low latency tier or a g latency tier) can include a synchronized live stream (e.g., a low latency stream. 412 and a high latency stream 424) and a prerecorded version 410 and 422, wherein the prerecorded version may be used based on a disruption of a live stream or based on an emergency generated at operation 362). In accordance with an embodiment, at operations 408 and 420, a determination is made as to a forced playback state (e.g., as determined in operation 358 and/or 362), which determines whether a user device (e.g., either premium tier 120A and/or standard tier 120B) plays a prerecorded (410 or 422) or live stream (412 or 424) version of a performance.

In accordance with an embodiment, as part of operation 204, advertising data may be included in the broadcast data and synchronized with one or more data streams. The advertising data may be synchronized with the determined multicast timecode (e.g., with an optimum timecode) and which may be displayed on a live multicasting user device 120. The advertising data may be added (e.g., by a VJ 382) using the VJ show operator device 310 or added (e.g., by an operator 380) using the admin show control device 350. For example, a VJ 382 may spontaneously select and add an advertisement at one or more times during a capturing of an event, wherein the advertisement is associated (e.g., using the live multicast stream encoder 346) with the one or more times via the multicast timecode. The added advertisement may be selected from a predetermined set of advertisements which may be accessed through the show operator device 310 and the admin show control device 350. In accordance with an embodiment, the advertisements may be included in the VJ events 330 and encoded in a broadcast during operation 204.

While illustrated in the block diagrams as groups of discrete components communicating with each other via distinct data signal connections, it will be understood by those skilled in the art that the various embodiments may be provided by a combination of hardware and software components, with some components being implemented by a given function or operation of a hardware or software system, and many of the data paths illustrated being implemented by data communication within a computer application or operating system. The structure illustrated is thus provided for efficiency of teaching the present various embodiments.

It should be noted that the present disclosure can be carried out as a method, can be embodied in a system, a computer readable medium or an electrical or electro-magnetic signal. The embodiments described above and illustrated in the accompanying drawings are intended to be exemplary only. It will be evident to those skilled in the art that modifications may be made without departing from this disclosure. Such modifications are considered as possible variants and lie within the scope of the disclosure.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. Such software may at least temporarily transform the general-purpose processor into a special-purpose processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

FIG. 5 is a block diagram 500 illustrating an example software architecture 502, which may be used in conjunction with various hardware architectures herein described to provide a gaming engine 501 and/or components of the live multicasting performance system 100. FIG. 5 is a non-limiting example of a software architecture and it will be appreciated that many other architectures may be implemented to facilitate the functionality described herein. The software architecture 502 may execute on hardware such as a machine 600 of FIG. 6 that includes, among other things, processors 610, memory 630, and input/output (I/O) components 650. A representative hardware layer 504 is illustrated and can represent, for example, the machine 600 of FIG. 6. The representative hardware layer 504 includes a processing unit 506 having associated executable instructions 508. The executable instructions 508 represent the executable instructions of the software architecture 502, including implementation of the methods, modules and so forth described herein. The hardware layer 504 also includes memory/storage 510, which also includes the executable instructions 508. The hardware layer 504 may also comprise other hardware 512.

In the example architecture of FIG. 5, the software architecture 502 may be conceptualized as a stack of layers where each layer provides particular functionality. For example, the software architecture 502 may include layers such as an operating system 514, libraries 516, frameworks or middleware 518, applications 520 and a presentation layer 544. Operationally, the applications 520 and/or other components within the layers may invoke application programming interface (API) calls 524 through the software stack and receive a response as messages 526. The layers illustrated are representative in nature and not all software architectures have all layers. For example, some mobile or special purpose operating systems may not provide the frameworks/middleware 518, while others may provide such a layer. Other software architectures may include additional or different layers.

The operating system 514 may manage hardware resources and provide common services. The operating system 514 may include, for example, a kernel 528, services 530, and drivers 532. The kernel 528 may act as an abstraction layer between the hardware and the other software layers. For example, the kernel 528 may be responsible for memory management, processor management (e.g., scheduling), component management, networking, security settings, and so on. The services 530 may provide other common services for the other software layers. The drivers 532 may be responsible for controlling or interfacing with the underlying hardware. For instance, the drivers 532 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 516 may provide a common infrastructure that may be used by the applications 520 and/or other components and/or layers. The libraries 516 typically provide functionality that allows other software modules to perform tasks in an easier fashion than to interface directly with the underlying operating system 514 functionality (e.g., kernel 528, services 530 and/or drivers 532). The libraries 616 may include system libraries 534 (e.g., C standard library) that may provide functions such as memory allocation functions, string manipulation functions, mathematic functions, and the like. In addition, the libraries 516 may include API libraries 536 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 516 may also include a wide variety of other libraries 538 to provide many other APIs to the applications 520 and other software components/modules.

The frameworks 518 (also sometimes referred to as middleware) provide a higher-level common infrastructure that may be used by the applications 520 and/or other software components/modules. For example, the frameworks/middleware 518 may provide various graphic user interface (GUI) functions, high-level resource management, high-level location services, and so forth. The frameworks/ middleware 518 may provide a broad spectrum of other APIs that may be utilized by the applications 520 and/or other software components/modules, some of which may be specific to a particular operating system or platform.

The applications 520 include built-in applications 540 and/or third-party applications 542. Examples of representative built-in applications 540 may include, but are not limited to, a contacts application, a browser application, a book reader application, a location application, a media application, a messaging application, and/or a game application. Third-party applications 542 may include any an application developed using the Android™ or iOS™ software development kit (SDK) by an entity other than the vendor of the particular platform, and may be mobile software running on a mobile operating system such as iOS™, Android™, Windows® Phone, or other mobile operating systems. The third-party applications 542 may invoke the API calls 524 provided by the mobile operating system such as operating system 514 to facilitate functionality described herein.

The applications 520 may use built-in operating system functions (e.g., kernel 528, services 530 and/or drivers 532), libraries 516, or frameworks/middleware 518 to create user interfaces to interact with users of the system. Alternatively, or additionally, in some systems, interactions with a user may occur through a presentation layer, such as the presentation layer 544. In these systems, the application/module "logic" can be separated from the aspects of the application/ module that interact with a user.

Some software architectures use virtual machines. In the example of FIG. 5, this is illustrated by a virtual machine 548. The virtual machine 548 creates a software environment where applications/modules can execute as if they were executing on a hardware machine (such as the machine 600 of FIG. 6, for example). The virtual machine 548 is hosted by a host operating system (e.g., operating system 514) and typically, although not always, has a virtual machine monitor 546, which manages the operation of the virtual machine 548 as well as the interface with the host operating system (i.e., operating system 514). A software architecture executes within the virtual machine 548 such as an operating system (OS) 550, libraries 552, frameworks 554, applications 556, and/or a presentation layer 558. These layers of software architecture executing within the virtual machine 548 can be the same as corresponding layers previously described or may be different.

Figure 6:
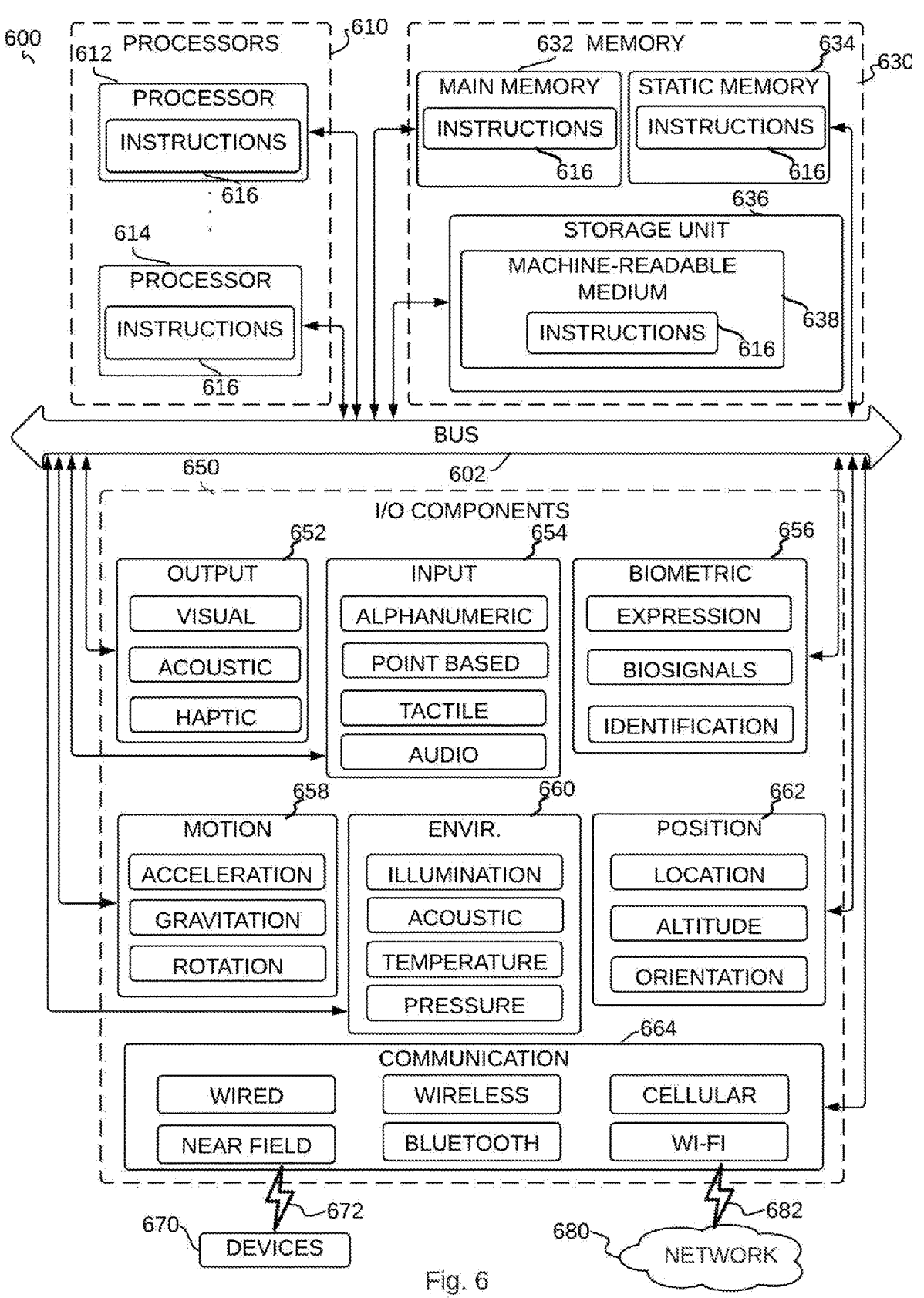
FIG. 6 is a block diagram illustrating components of a machine, according to some example embodiments, configured to read instructions from a machine-readable medium (e.g., a machine-readable storage medium) and perform any one or more of the methodologies discussed herein.

FIG. 6 is a block diagram illustrating components of a machine 600, according to some example embodiments, configured to read instructions from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. As such, the instructions 616 may be used to implement modules or components described herein. The instructions transform the general, non-programmed machine into a particular machine programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines that individually or jointly execute the instructions 616 to perform any one or more of the methodologies discussed herein.

The machine 600 may include processors 610, memory 630, and input/output (I/O) components 650, which may be configured to communicate with each other such as via a bus 602. In an example embodiment, the processors 610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 612 and a processor 614 that may execute the instructions 616. The term "processor" is intended to include multi-core processor that may comprise two or more independent processors (sometimes referred to as "cores") that may execute instructions contemporaneously. Although FIG. 6 shows multiple processors, the machine 600 may include a single processor with a single core, a single processor with multiple cores (e.g., a multi-core processor), multiple processors with a single core, multiple processors with multiples cores, or any combination thereof.

The memory/storage 630 may include a memory, such as a main memory 632, a static memory 634, or other memory, and a storage unit 636, both accessible to the processors 610 such as via the bus 602. The storage unit 636 and memory 632, 634 store the instructions 616 embodying any one or more of the methodologies or functions described herein. The instructions 616 may also reside, completely or partially, within the memory 632, 634, within the storage unit 636, within at least one of the processors 610 (e.g., within the processor's cache memory), or any suitable combination thereof, during execution thereof by the machine 600. Accordingly, the memory 632, 634, the storage unit 636, and the memory of processors 610 are examples of machine-readable media 638.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the instructions 616. The term "machine-readable medium" shall also be taken to include any medium, or combination of multiple media, that is capable of storing instructions (e.g., instructions 616) for execution by a machine (e.g., machine 600), such that the instructions, when executed by one or more processors of the machine 600 (e.g., processors 610), cause the machine 600 to perform any one or more of the methodologies or operations, including non-routine or unconventional methodologies or operations, or non-routine or unconventional combinations of methodologies or operations, described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 650 may include a wide variety of components to receive input, provide output, produce output, transmit information, exchange information, capture measurements, and so on. The specific input/output (I/O) components 650 that are included in a particular machine will depend on the type of machine. For example, portable machines such as mobile phones will likely include a touch input device or other such input mechanisms, while a headless server machine will likely not include such a touch input device. It will be appreciated that the input/output (I/O) components 650 may include many other components that are not shown in FIG. 6. The input/output (I/O) components 650 are grouped according to functionality merely for simplifying the following discussion and the grouping is in no way limiting. In various example embodiments, the input/output (I/O) components 650 may include output components 652 and input components 654. The output components 652 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the input/output (I/O) components 650 may include biometric components 656, motion components 658, environmental components 660, or position components 662, among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 662 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 650 may include communication components 664 operable to couple the machine 600 to a network 680 or devices 670 via a coupling 682 and a coupling 672 respectively. For example, the communication components 664 may include a network interface component or other suitable device to interface with the network 680. In further examples, the communication components 664 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., a peripheral device coupled via a Universal Serial Bus (USB)).

Moreover, the communication components 664 may detect identifiers or include components operable to detect identifiers. For example, the communication components 664 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 662, such as, location via Internet Protocol (IP) geo-location, location via Wi-Fi® signal triangulation, location via detecting a NFC beacon signal that may indicate a particular location, and so forth.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The term 'content' used throughout the description herein should be understood to include all forms of media content items, including images, videos, audio, text, 3D models (e.g., including textures, materials, meshes, and more), animations, vector graphics, and the like.

The term 'game' used throughout the description herein should be understood to include video games and applications that execute and present video games on a device, and applications that execute and present simulations on a device. The term 'game' should also be understood to include programming code (either source code or executable binary code) which is used to create and execute the game on a device.

The term 'environment' used throughout the description herein should be understood to include 2D digital environments (e.g., 2D video game environments, 2D simulation environments, 2D content creation environments, and the like), 3D digital environments (e.g., 3D game environments, 3D simulation environments, 3D content creation environments, virtual reality environments, and the like), and augmented reality environments that include both a digital (e.g., virtual) component and a real-world component.

The term 'digital object', used throughout the description herein is understood to include any object of digital nature, digital structure or digital element within an environment. A digital object can represent (e.g., in a corresponding data structure) almost anything within the environment; including 3D models (e.g., characters, weapons, scene elements (e.g., buildings, trees, cars, treasures, and the like)) with 3D model textures, backgrounds (e.g., terrain, sky, and the like), lights, cameras, effects (e.g., sound and visual), animation, and more. The term 'digital object' may also be understood to include linked groups of individual digital objects. A digital object is associated with data that describes properties and behavior for the object.

The terms 'asset', 'game asset', and 'digital asset', used throughout the description herein are understood to include any data that can be used to describe a digital object or can be used to describe an aspect of a digital project (e.g., including: a game, a film, a software application). For example, an asset can include data for an image, a 3D model (textures, rigging, and the like), a group of 3D models (e.g., an entire scene), an audio sound, a video, animation, a 3D mesh and the like. The data describing an asset may be stored within a file, or may be contained within a collection of files, or may be compressed and stored in one file (e.g., a compressed file), or may be stored within a memory. The data describing an asset can be used to instantiate one or more digital objects within a game at runtime (e.g., during execution of the game).

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

We claim:

1. A system comprising:
one or more computer processors;
one or more computer memories;
a set of instructions stored in the one or more computer memories, the set of instructions configuring the one or more computer processors to perform operations, the operations comprising:
receiving a plurality of streams corresponding to an event, each of the plurality of streams having different types, wherein the different types include at least two of video data, audio data, motion capture data, show control data, and volumetric data;
determining a multicast timecode based on a single synchronization time that works with all of a plurality of buffers associated with the plurality of streams, wherein determining the single synchronization time includes determining a minimum buffer size for each of the different types; and
generating a stream that includes the plurality of streams and the multicast timecode.

2. The system of claim 1, the operations further comprising broadcasting the stream over a network in a low-latency mode and a high-latency mode.

3. The system of claim 2, wherein a receiving device records part or all of the broadcasting of the stream in the high-latency mode and displays the broadcasting of the stream in the low-latency mode.

4. The system of claim 3, wherein the receiving device switches to displaying of the broadcasting of the stream in the high-latency mode based on an interruption of the displaying of the stream in the low-latency mode.

5. The system of claim 3, wherein the receiving device switches to displaying of the broadcasting of the stream in the high-latency mode based on a determination that a cost associated with the broadcasting of the stream in the low-latency mode has transgressed a cost threshold.

6. The system of claim 1, wherein the event is a live event and event data in each of the plurality of streams is received during the live event in real-time.

7. The system of claim 1, wherein the multicast timecode replaces or is added to one or more native timecodes included in the plurality of streams.

8. A non-transitory computer-readable storage medium storing a set of instructions that, when executed by one or more computer processors, causes the one or more computer processors to perform operations, the operations comprising:
receiving a plurality of streams corresponding to an event, each of the plurality of streams having different types, wherein the different types include at least two of video data, audio data, motion capture data, show control data, and volumetric data;
determining a multicast timecode based on a single synchronization time that works with all of a plurality of buffers associated with the plurality of streams, wherein determining the single synchronization time includes determining a minimum buffer size for each of the different types; and
generating a stream that includes the plurality of streams and the multicast timecode.

9. The non-transitory computer-readable storage medium of claim 8, the operations further comprising broadcasting the stream over a network in a low-latency mode and a high-latency mode.

10. The non-transitory computer-readable storage medium of claim 9, wherein a receiving device records part or all of the broadcasting of the stream in the high-latency mode and displays the broadcasting of the stream in the low-latency mode.

11. The non-transitory computer-readable storage medium of claim 10, wherein the receiving device switches to displaying of the broadcasting of the stream in the high-latency mode based on an interruption of the displaying of the stream in the low-latency mode.

12. The non-transitory computer-readable storage medium of claim 10, wherein the receiving device switches to displaying of the broadcasting of the stream in the high-latency mode based on a determination that a cost associated with the broadcasting of the stream in the low-latency mode has transgressed a cost threshold.

13. The non-transitory computer-readable storage medium of claim 8, wherein the event is a live event and event data in each of the plurality of streams is received during the live event in real-time.

14. The non-transitory computer-readable storage medium of claim 8, wherein the multicast timecode replaces or is added to one or more native timecodes included in the plurality of streams.

15. A method comprising:
receiving a plurality of streams corresponding to an event, each of the plurality of streams having different types, wherein the different types include at least two of video data, audio data, motion capture data, show control data, and volumetric data;
determining a multicast timecode based on a single synchronization time that works with all of a plurality of buffers associated with the plurality of streams, wherein determining the single synchronization time includes determining a minimum buffer size for each of the different types; and
generating a stream that includes the plurality of streams and the multicast timecode.

16. The method of claim 15, further comprising broadcasting the stream over a network in a low-latency mode and a high-latency mode.

17. The method of claim 16, wherein a receiving device records part or all of the broadcasting of the stream in the high-latency mode and displays the broadcasting of the stream in the low-latency mode.

18. The method of claim 17, wherein the receiving device switches to displaying of the broadcasting of the stream in the high-latency mode based on an interruption of the displaying of the stream in the low-latency mode.

19. The method of claim 15, wherein the event is a live event and event data in each of the plurality of streams is received during the live event in real-time.

20. The method of claim 15, wherein the multicast timecode replaces or is added to one or more native timecodes included in the plurality of streams.

* * * * *